US008625479B2

(12) United States Patent
Chion et al.

(10) Patent No.: US 8,625,479 B2
(45) Date of Patent: Jan. 7, 2014

(54) DATA SYNCHRONIZATION FOR MULTICAST/BROADCAST SERVICE IN WIRELESS RELAY NETWORK

(75) Inventors: Hua Mary Chion, Belle Mead, NJ (US); Hongyun Qu, Guangdong (CN); Ling Xu, GuangDong (CN); Jerry Pak Lup Chow, San Diego, CA (US); Yang Liu, Guangdong (CN); Yuqin Chen, Shenzhen (CN)

(73) Assignee: ZTE (USA) Inc., Morristown, NJ (US)

( * ) Notice: Subject to any disclaimer, the term of this patent is extended or adjusted under 35 U.S.C. 154(b) by 963 days.

(21) Appl. No.: 12/099,111

(22) Filed: Apr. 7, 2008

(65) Prior Publication Data

US 2008/0247372 A1    Oct. 9, 2008

Related U.S. Application Data

(60) Provisional application No. 60/910,559, filed on Apr. 6, 2007.

(51) Int. Cl.
*H04J 3/08* (2006.01)
(52) U.S. Cl.
USPC ......................................................... 370/315

(58) Field of Classification Search
None
See application file for complete search history.

(56) References Cited

U.S. PATENT DOCUMENTS

| 2005/0255862 | A1* | 11/2005 | Jung et al. ................ 455/456.2 |
| 2006/0083216 | A1 | 4/2006 | Kwack |
| 2006/0153132 | A1* | 7/2006 | Saito ............................ 370/329 |
| 2008/0165699 | A1* | 7/2008 | Wei ............................... 370/252 |
| 2008/0260000 | A1* | 10/2008 | Periyalwar et al. .......... 375/133 |
| 2009/0017814 | A1* | 1/2009 | Horiuchi et al. ........... 455/422.1 |

FOREIGN PATENT DOCUMENTS

CN        1764143 A      4/2006

OTHER PUBLICATIONS

IEEE 802.16j, Broadband Wireless Access Working Group, "Multi-hop Relay System Evaluation Methodology (Channel Model and Performance Metric)," Sep. 5, 2006, 38 pages.

* cited by examiner

*Primary Examiner* — Kevin C Harper
*Assistant Examiner* — Samina Choudhry
(74) *Attorney, Agent, or Firm* — Perkins Coie LLP

(57) ABSTRACT

Wireless communication relay networks and techniques for providing data synchronization in Multicast Broadcast Services (MBS).

45 Claims, 8 Drawing Sheets

Example of Wireless Mobile Relay Access Network

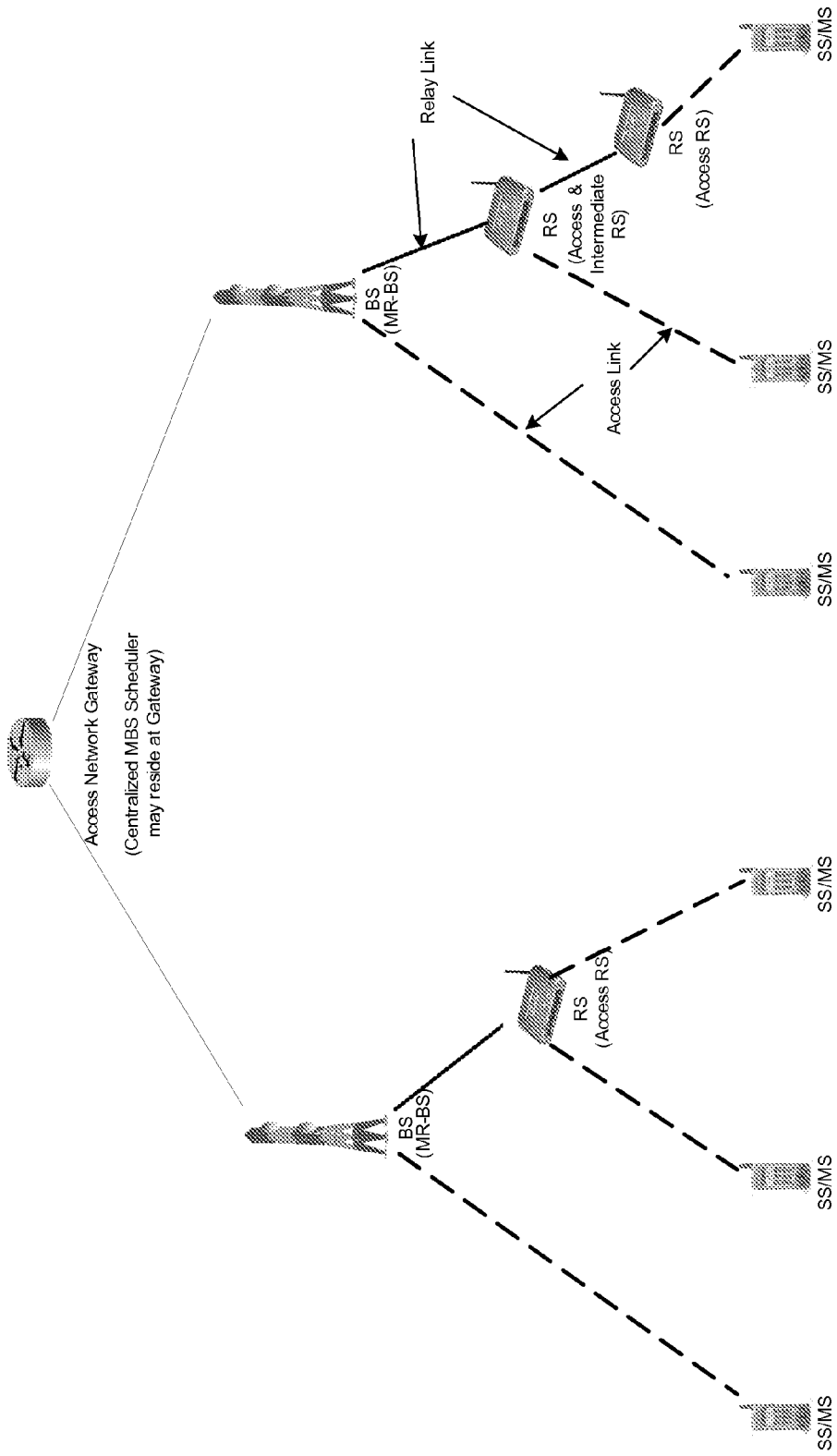
Fig 1 Example of Wireless Mobile Relay Access Network

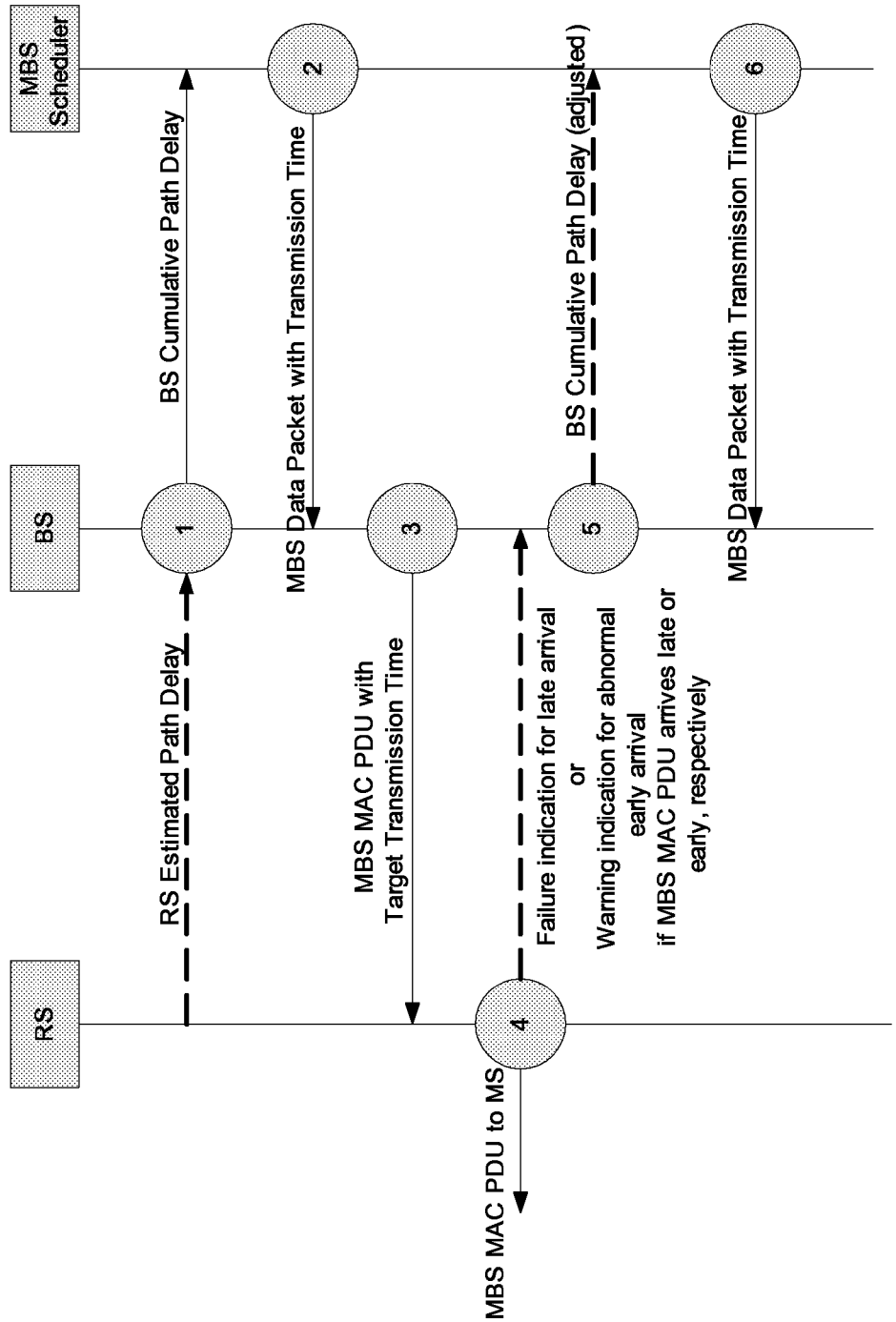
Fig 2 MBS Data Synchronization Between BS and RS

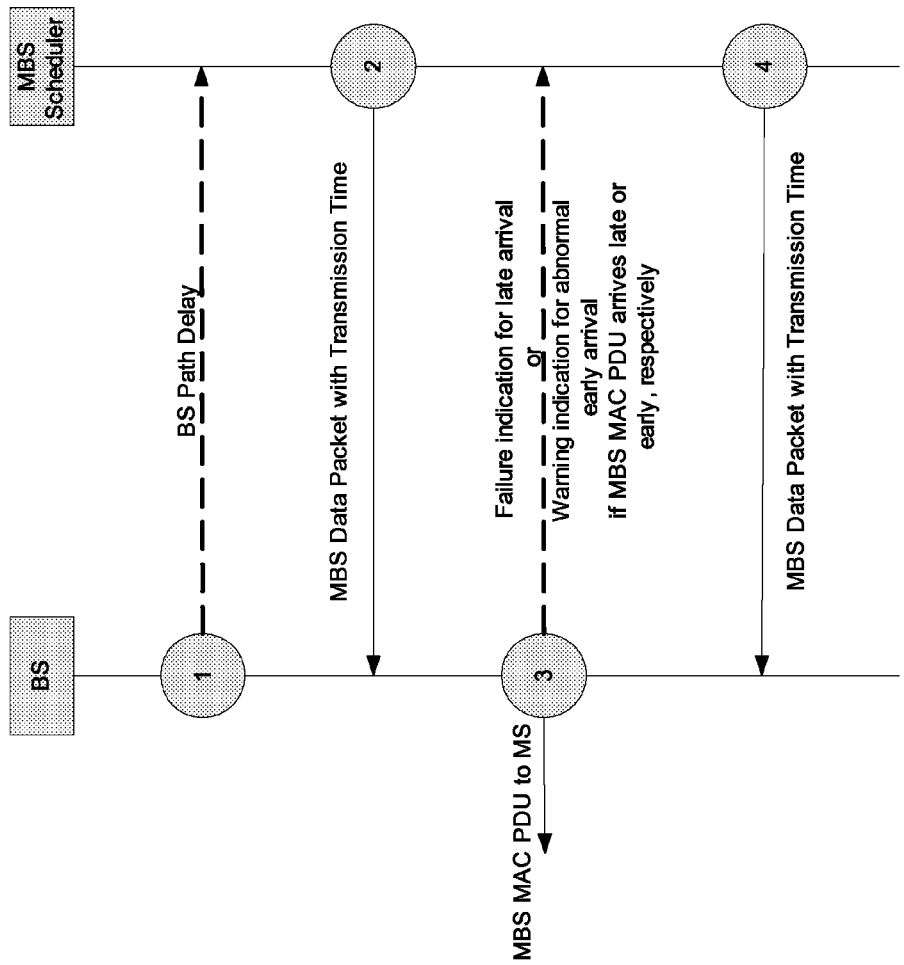
Fig 3 MBS Data Synchronization Between BS And MBS Scheduler

- Relay MAC PDU is transmitted between MR-BS and RS
- Relay MAC PDU can include relay MAC Header as shown in Fig 4
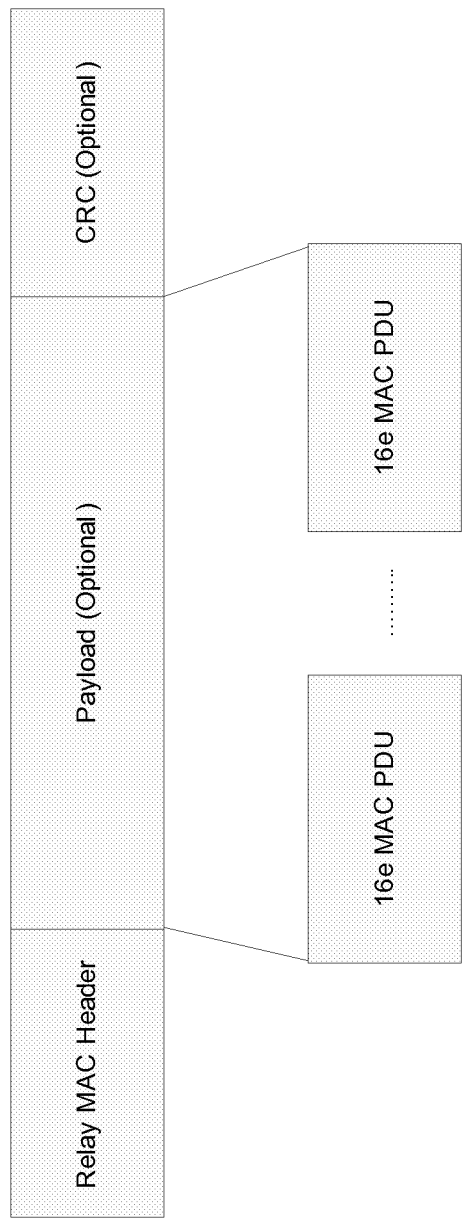
Fig 4 Relay MAC PDU with Relay MAC Header

- For MBS MAC PDU, Relay MAC Header shall indicate the inclusion of MBS subheader by setting MBS bit to 1.
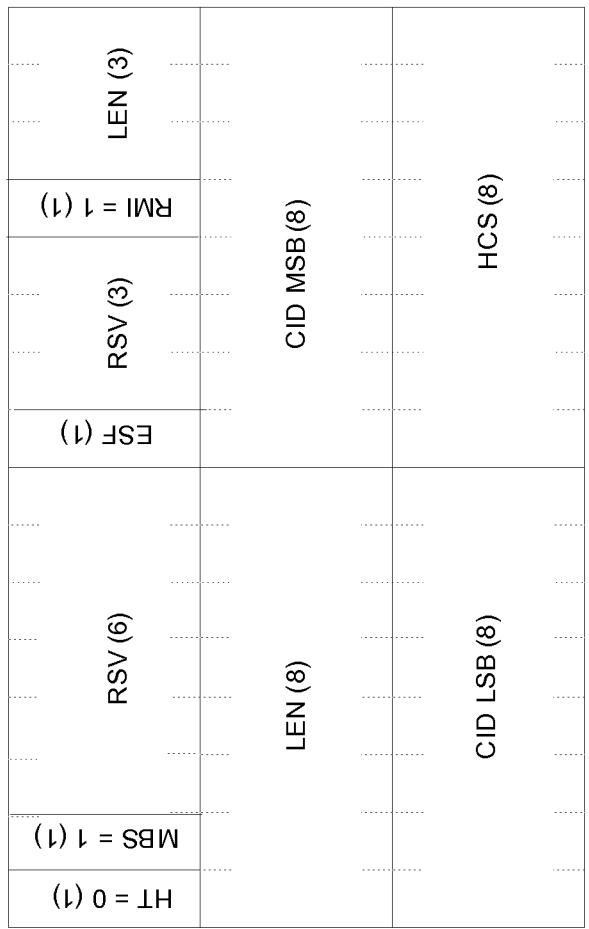
Fig 5  Relay MAC Header For MBS Connection

- MBS NACK Feedback header is as shown in Fig 6
  - Feedback Type shall be set to 1100
  - ELI bits indicates Arrival Delta is for Early or Late: 0: Late; 1:Early
  - Shall include Arrival Delta information as the number of frames RS receive MBS data from MR-BS late or early
  - CID shall be set to CID of the MBS connection RS is sending NACK feedback for.

| HT = 1 (1) | EC = 1 (1) | Type = 0 (1) | CII = 1 (1) | Arrival Delta (8) | |
|---|---|---|---|---|---|
| ELI(1) | RSV (7) | | | CID MSB (8) | |
| | | | | CID LSB (8) | HCS (8) |

Fig 6 MBS NACK Feedback Header

FIG. 7: BS Subheader

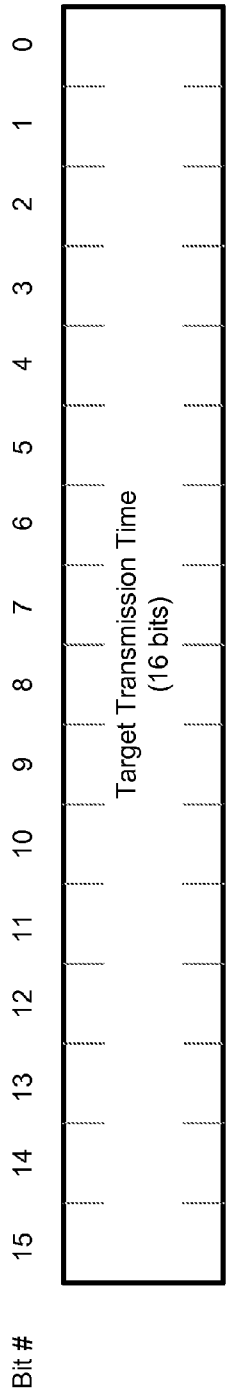

FIG. 7a: Transmission Target Time included as separately defined MBS subheader

Target Transmission Time: LSB 16 bits of frame number of the frame that RS shall transmit the MAC PDU

Allocation subheader format

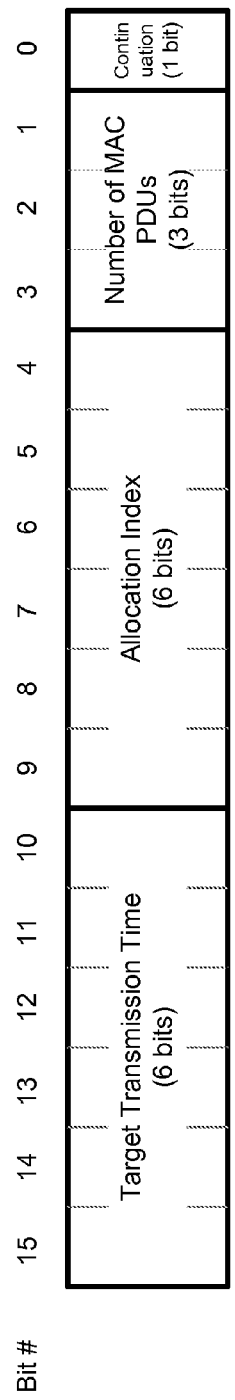

FIG. 7b: Transmission Target Time included as part of Allocation subheader

Target Transmission Time: LSB 6 bits of frame number of the frame that RS shall transmit the MAC PDU

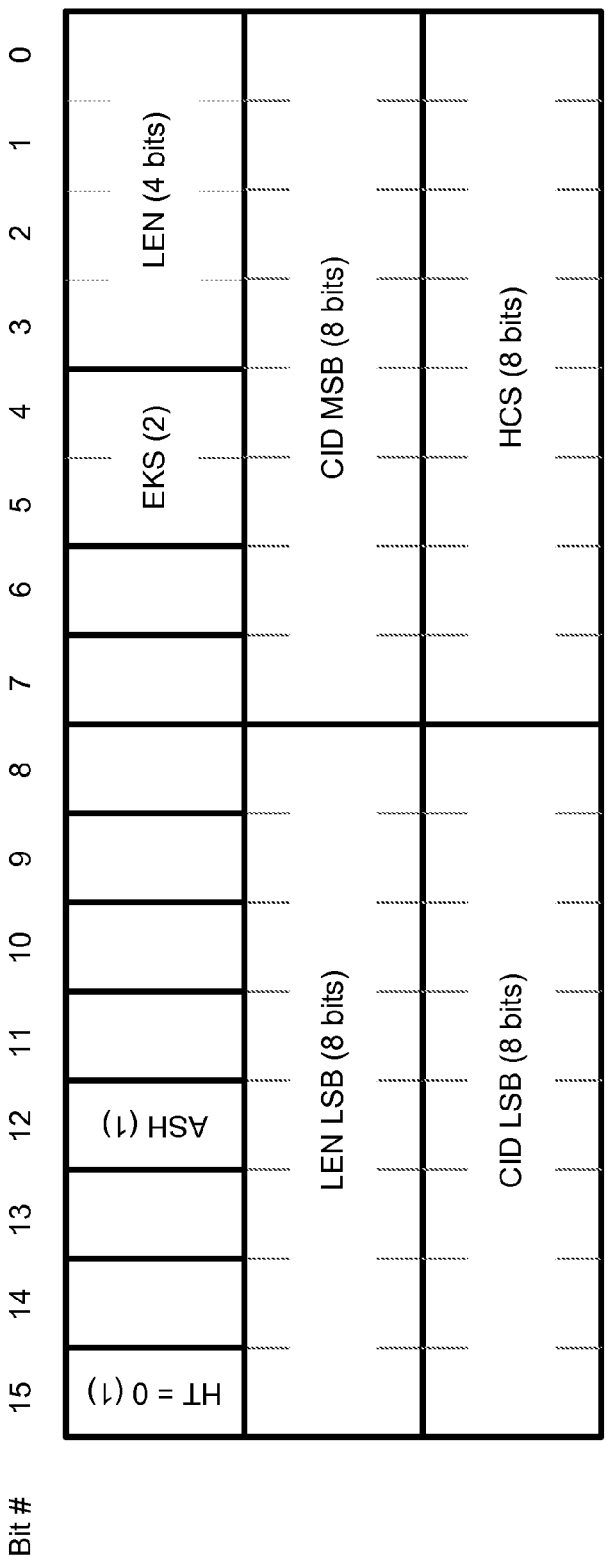
FIG. 8: Exemplary Relay MAC Header Format When MBS Subheader Info is Supported Via Allocation Subheader ue to various factors. Various structures may block the radio signals of certain base stations. For example,

DATA SYNCHRONIZATION FOR MULTICAST/BROADCAST SERVICE IN WIRELESS RELAY NETWORK

PRIORITY CLAIM AND RELATED APPLICATION

This application claims benefit of U.S. Provisional Application No. 60/910,559 entitled "DATA SYNCHRONIZATION FOR MULTICAST/BROADCAST SERVICE IN WIRELESS RELAY NETWORK" and filed on Apr. 6, 2007, which is incorporated by reference as part of the specification of this application.

BACKGROUND

This application relates to wireless communication systems and techniques for wireless communications using one or more relay stations in addition to base stations.

Wireless communication systems use electromagnetic waves to communicate with fixed and mobile wireless communication devices, e.g., mobile wireless phones and laptop computers with wireless communication cards, that are located within cells of coverage areas of the systems. A radio spectral range or band designated or allocated for a wireless communication service or a particular class of wireless services may be divided into different radio carrier frequencies for generating different communication frequency channels. Such systems use base stations spatially distributed to provide radio coverage in a geographic service area which is divided into cells. In such a cellular deployment, each base station (BS) is conceptually located at the center of a respective cell to provide radio coverage for that cell and transmits information to a wireless subscriber station (SS) such as a mobile SS (MSS) via BS-generated downlink (DL) radio signals. A subscriber station at a particular cell transmits information to its serving base station for that particular cell via uplink (UL) radio signals. The base stations can include directional antennas to further divide each cell into different cell sectors where each antenna covers one sector. This sectorization of a cell increases the communication capacity.

The radio coverage of a network of fixed base stations may be limited due to various factors. Various structures may block the radio signals of certain base stations. For example, a tall building may shield a particular area from the radio signal from a base station, thus creating an undesired shadowing. At the edge of a radio cell, the signal strength can be weak and hence can increase the error rate in the wireless communications. One approach to mitigating these and other limitations is to increase the number of base stations in a given service area. In one implementation under this approach, one or more relay stations (RSs) can be deployed among certain fixed base stations to relay communication signals between a subscriber station and a base station, thus extending the coverage and improving the communication capacity and quality of the base station. A relay station may be a fixed transceiver or a mobile transceiver station depending on the specific conditions for deploying such as relay station. A subscriber station (SS) signal may hop through one or more RSs before reaching a serving base station. The proposed IEEE 802.16j provides Multi-hop Relay (MR) modes to use relay stations for enhanced coverage and service to subscribers. A multi-hop relay wireless network under IEEE 802.16j can include MR base stations (MR-BSs) with the support of the Multi-hop Relay modes. A relay station can be fixed, nomadic or mobile. A wireless relay access network supports data transmission between BS and MS either directly or through one or more RSs. IEEE 802.16j defines air interface standard for a wireless relay access network based on OFDMA technology.

SUMMARY

This application describes, among others, wireless communication relay networks and techniques for providing data synchronization in MBS services.

In one aspect, a wireless communication relay network includes a plurality of base stations forming a radio network; a plurality of relay stations in communication with the base stations, each relay station being slaved to a base station to extend radio coverage of the base station; a Multicast Broadcast Services (MBS) scheduler to determine a target transmission time for transmitting a MBS data packet for one or more base stations; a mechanism to operate a base station to send the target transmission time along with the MBS data packet to one or more relay stations that carry the MBS service; and a mechanism to operate, a respective relay station in a relay path of the MBS data packet from the base station, to transmit the MBS data packet to a subscriber or mobile station in the network at the target transmission time, and to send a failure indication to a base station when the relay station is not able to transmit the MBS data packet due to a late arrival or abnormal early arrival of the MBS data packet.

In another aspect, a wireless communication relay network includes a plurality of base stations forming a radio network; a plurality of relay stations in communication with the base stations, each relay station being slaved to a base station to extend radio coverage of the base station; a Multicast Broadcast Services (MBS) scheduler to determine a target transmission time or a target transmission time window for transmitting a MBS data packet for one or more base stations; means for operating a base station to send the target transmission time or target transmission time window along with the MBS data packet to one or more relay stations that carry the MBS service; and means for operating a respective relay station in a relay path of the MBS data packet from the base station to (1) transmit the MBS data packet to a subscriber or mobile station in the network at the target transmission time or within the target transmission time window, and (2) to send a failure indication to a base station when the relay station is not able to transmit the MBS data packet due to a late arrival or abnormal early arrival of the MBS data packet.

In another aspect, a method for providing Multicast Broadcast Services (MBS) in a wireless communication relay network is provided. This network includes a plurality of base stations forming a radio network and a plurality of relay stations in communication with the base stations with each relay station being slaved to a base station to extend radio coverage of the base station. The method for this network includes providing a MBS scheduler to determine a target transmission time or a target transmission time window for transmitting a MBS data packet for one or more base stations; operating a base station to send the target transmission time or target transmission time window along with the MBS data packet to one or more relay stations that carry the MBS service; operating a respective relay station in a relay path of the MBS data packet from the base station to (1) transmit the MBS data packet to a subscriber or mobile station in the network at the target transmission time or within the target transmission time window; and operating the respective relay station to send a failure indication to a base station when the relay station is not able to transmit the MBS data packet due to a late arrival or abnormal early arrival of the MBS data packet.

In another aspect, a wireless communication relay network includes a plurality of base stations forming a radio network; a plurality of relay stations in communication with the base stations, each relay station being slaved to a base station to extend radio coverage of the base station; a Multicast Broadcast Services (MBS) scheduler to determine a target transmission time or target transmission time window for transmitting MBS data by each of the base stations involved in a MBS connection; and means for operating a respective base station to transmit MBS data to a subscriber or mobile station at the target transmission time or within the target transmission time window.

In yet another aspect, a method provides a multicast broadcast service (MBS) in a wireless communication relay system which includes a plurality of base stations forming a radio network and a plurality of relay stations in communication with the base stations with each relay station being slaved to a base station to extend radio coverage of the base station. The method includes causing a base station to transmit MBS data and a target transmission time or target transmission time window for transmitting the MBS data to a relay station; and causing the relay station to transmit the MBS data to a subscriber or mobile station at the target transmission time or within the target transmission time window. In implementations of the above method, various features can be provided.

For example, one or more of the following features may be included: (1) causing a relay station to send an indication signaling to a base station to report a late arrival of MBS data when the relay station receives the MBS data at a time after the target transmission time or the target transmission time window, or when the relay station reports an abnormal early arrival of MBS data; (2) causing a relay station to report a delay of the MBS data to a respective base station during a process for capability negotiation, and causing the base station to determine a cumulative path delay of the base station associated with a largest path delay of a relay path; (3) causing the base station to insert a subheader in the MBS Relay Medium Access Control (MAC) Protocol Data Unit (PDU) that is sent to a relay station, wherein the subheader includes the information of the target transmission time or target transmission window time; and causing the relay station to remove the received relay MAC header and subheader and transmit the MBS data to a subscriber or mobile station over an access link at the target transmission time or within the target transmission time window; (4) causing the base station to determine a cumulative path delay of the base station associated with a largest path delay of a relay path; causing the base station to determine a new cumulative path delay after receiving indication signaling from one or more relay stations about delay in transmission of MBS data; causing the base station to report the newly determined cumulative path delay to the MBS scheduler; and causing the MBS scheduler to determine a new target transmission time or target transmission time window in response to the report from the base station; (5) using a threshold as a trigger for an early arrival of MBS data; (6) causing a relay station to transmit an early arrival indication signal when the relay station receives a MBS Medium Access Control (MAC) Protocol Data Unit (PDU) prior to the target transmission time or target transmission time window; and (7) using a MBS feedback header to carry the indication signaling indicates the early arrival or late arrival of the MBS data.

Particular examples and embodiments described in this specification can be implemented to realize one or more of advantages. The details of one or more embodiments are set forth in the accompanying drawings and the description below. Other features, aspects, and advantages of the invention will become apparent from the description, the drawings, and the claims.

BRIEF DESCRIPTION OF DRAWINGS

FIG. 1 shows an example of wireless relay access network which provides services to subscriber stations (SSs) or mobile stations (MSs) via relation stations (RSs).

FIG. 2 shows an exemplary message flow of the present synchronization for synchronizing BS/RS data.

FIG. 3 shows an exemplary message flow for MBS scheduler/BS data synchronization.

FIG. 4 and FIG. 5 show exemplary formats of a relay MAC header and a MAC PDU, respectively.

FIG. 6 shows an example of MBS NACK Feedback header that is used both for failure indication for late arrival and warning indication for abnormal early arrival.

FIG. 7 includes FIGS. 7a and 7b and shows example formats for a MBS subheader used to implement MBS synchronization.

FIG. 8 shows another example format for the Relay MAC Header when the Target Transmission Time information.

DETAILED DESCRIPTION

This application describes, among others, systems, apparatus and methods that provide synchronized data transmission for multicast/broadcast services over OFDMA wireless relay network.

Referring to FIG. 1, Multicast Broadcast Services (MBS) service flows can be carried over unidirectional point-to-multipoint connections from BS to MSs. One MBS service flow can be transmitted over a group of BSs that form the service region of the MBS service flow. Signal transmissions from a BS to MS may transit one or more Relay Stations (RSs) in order to improve the radio coverage area of the BS. In an OFDMA wireless relay network, for multi-BS MBS, a group of BSs and attached RSs form the service region to provide MBS service to MSs. For single-BS MBS, a BS and its attached RS form the service region to transmit the MBS data to MBs in the cell coverage. A MS, depending on its channel condition, may receive signals from multiple BSs, which may occur via one or more RSs subtending from a BS in addition to directly from the BS itself, if the transmissions are synchronized. If multiple BSs transmit data for an MBS service flow in a synchronized fashion, the MS can receive and combine the signals from multiple BSs to achieve macro-diversity for the MBS service flow. In an OFDMA wireless system, such synchronized transmission of MBS data to enable macro-diversity reception implies all BSs and any subtending RSs involved should transmit the same block of data at the same Frame/Slot/subchannel and with the same modulation scheme. In an OFDMA wireless relay network, synchronized transmission of MBS data implies all the BSs and RSs involved should transmit the same block of data at the same frame/Slot/Subchannel and with the same modulation scheme.

Alternatively, synchronization of the transmission of the same data from multiple BSs may be less strict in that synchronization is only to within a certain window of time but the transmissions may not be exactly aligned in time and frequency within this time window. While this latter looser form of synchronization cannot support macro-diversity reception of the transmissions, it nevertheless can provide power savings at the MS since it is not required to actively receive except during the known time windows within which the data transmissions occur even as the MS moves between the coverage areas of the various BSs that form the MBS service region.

In one implementation, a MBS scheduler can be used to synchronize data transmission to either an exact time or a specified time window that covers different times. A MBS scheduler can be centralized or distributed in the network. In an OFDMA wireless system, the centralized MBS scheduler can be located in one Access Network Gateway as a functionality entity, and the distributed MBS scheduler can be located in several Access Network Gateways and negotiate each other. In an OFDMA wireless relay system, for multi-BS MBS, the centralized MBS scheduler can be located in Access Network Gateway as a functionality entity. For single-BS MBS, the centralized MBS scheduler could be located in BS. Generally, the centralized MBS scheduler is used for MBS service in the current OFDMA wireless system.

The centralized MBS scheduler determines the transmission time of each MBS packet and informs each BS within the MBS service region of its decision. In a wireless relay network, the centralized MBS scheduler can encounter one or more of the following and other issues when determining the transmission time:

1. Each RS introduces a delay to the transmission relay path from BS to a subscriber or mobile station (SS/MS). The value of the delay varies depending on traffic loading, QoS requirements of each connection and system implementation.

2. An access station through which an SS/MS accesses the network can be either a BS or RS. An access relay path, defined as the transmission path from an RS access station (access RS) to the BS, exists if transmissions between BS and SS/MS occur through one or more RSs and therefore, can contain a variable number of hops (each RS in the path is considered to be a hop).

3. RSs can enter or exit the network which causes changes in cumulative delay of an access relay path. This change can in turn impact the overall delay that the MBS scheduler needs to impose on MBS data if such change affects the path with longest delay from centralized MBS scheduler to any access station (i.e. BS or access RS) of the MBS service region.

The synchronization mechanism presented herein, in one implementation, can be configured to adaptively support variable access relay path delays introduced by the delay of RS and the number of hops on the path. This mechanism is defined to allow network reconfiguration due to RS entering/exiting network without additional signaling. The same mechanism can also be used to provide data synchronization between BS and MBS scheduler.

As an example, FIG. 2 shows the message flow of the synchronization method for synchronizing BS/RS data. The operation at each numbered circle in FIG. 2 is detailed as follows:

(1) RS optionally reports its processing delay to BS. This processing delay represents a commitment made by an RS that on reception of an MBS data packet for a particular MBS service flow that the RS will be able transmit the MBS data packet over its radio access link to the SS/MS or if applicable, be able to transmit the MBS data packet to the next hop towards the access RS with a delay no longer than that reported. Therefore, this processing delay needs to account for the RS processing of the MBS data packet for transmission over its radio access link and for any required queuing of the MBS data packet from reception at the RS to that transmission or if applicable, for the RS processing of the MBS data packet for transmission over the relay link to the next hop towards the access RS and for any required queuing from reception at the RS and that transmission. The processing delay reported to the BS is the delay from reception to transmission over the RS's access link or if applicable, the larger of this processing delay and the processing delay from reception and transmission on the relay link to the next hop towards the access RS. The BS determines its cumulative path delay based on RS reporting. The cumulative path delay is the largest path delay of any access relay path (an access relay path might include one or more hops).

(2) MBS scheduler determines the transmission delay based on information received from all BSs involved in the MBS connection. For each MBS data packet, MBS scheduler sends the transmission time along with the packet to each BS. As examples, frame number or absolute time referenced to a common time clock reference such as Greenwich Mean Time can be used as forms of transmission time.

(3) BS composes a Medium Access Control (MAC) protocol data unit (PDU) for MBS connection and forwards it to RS. For each MBS MAC PDU, the transmission time is attached to it. As an example, frame number can be included as part of MAC header for the MAC PDU.

(4) If RS receives MBS MAC PDU before its designated transmission time, the RS sends the MAC PDU to MS at the transmission time; if RS fails to receive the MBS MAC PDU on time, the RS sends a failure indication for late arrival, such as in the form of a negative acknowledgement (NACK) message or some other kind of feedback indication, to BS indicating the late arrival of the packet. The RS also includes the arrival delay in the failure indication to facilitate readjustment of time alignment between the RS and the BS.

In addition, the RS may send a warning indication for abnormal early arrival, such as in the form of a negative acknowledgement (NACK) message or some other kind of feedback indication, to report abnormal early arrival of MBS data. The warning indication for abnormal early arrival detection can be triggered by a pre-determined threshold, referred to as Allowed Early Arrival or Data Early Arrival Report Threshold. This threshold value can be pre-provisioned or determined and possibly adjusted dynamically. If an MBS MAC PDU arrives at a RS prior to a time equal to (Transmission Time—Allowed Early Arrival), the RS sends a warning indication for abnormal early arrival including the amount of time by which the arrival was early to the BS.

(5) When BS receives failure indication for late arrival or warning indication for abnormal early arrival from one or more RSs, it determines its new cumulative path delay based on the information and reports the adjustment to MBS scheduler. If one or more RS's within the span of control of a BS reports a failure indication for late arrival, the cumulative path delay is increased by an amount that is at least equal to the largest reported late arrival amount, and if at the same time, one or more RS's report warning indications for abnormal early arrival, their Allowed Early Arrival threshold can be increased accordingly since these warning indications are extraneous. If no RSs report failure indications for late arrival and one or more RSs report warning indications for abnormal early arrival, then the cumulative path delay can be reduced by the amount of the smallest reported early arrival duration.

(6) As in step 2, MBS scheduler determines the transmission delay based on information received from all BSs involved in the MBS service flow. For each MBS data packet, MBS scheduler sends the transmission time along with the packet to each BS. As an example, frame number can be used as a form of transmission time.

FIG. 3 shows the message flow for the synchronization method as applied to MBS scheduler/BS data synchronization in the above example implementation. The operation at each numbered circle in FIG. 3 is detailed as following:

(1) BS optionally reports its delay in transmitting MBS data to MBS scheduler. If the BS is not an MR-BS (that is, if there is no access relay network that subtends from the BS), then this delay needs to account for the processing delay through the BS only. If the BS is an MR-BS, then this delay needs to account for the processing delay of the BS and the access relay path with the longest delay.

(2) MBS scheduler determines the transmission delay based on information received from all BSs involved in the transmissions for the MBS service flow. For each MBS data packet, MBS scheduler sends the transmission time along with the packet to each BS. As an example, frame number can be used as a form of transmission time.

(3) If BS receives MBS MAC PDU before its designated transmission time, the BS sends the MAC PDU to MS at the transmission time; if BS fails to receive the MBS MAC PDU on time, the BS sends a failure indication for late arrival to MBS scheduler indicating the late arrival of the packet. The BS also includes the arrival delay in the failure indication to facilitate readjustment of time alignment between the MBS Scheduler and the BS. In addition, the BS may send a warning indication for abnormal early arrival to report abnormal early arrival of MBS data. The warning indication for abnormal early arrival detection can be triggered by a pre-determined threshold, referred to as Allowed Early Arrival or Data Early Arrival Report Threshold, for the network. When a MBS MAC PDU arrives at a BS prior to a time, called the early arrival duration, that is equal to Transmission Time—Allowed Early Arrival, the BS sends a warning indication for abnormal early arrival including the early arrival duration to the MBS scheduler.

(4) When MBS scheduler receives failure indication for late arrival or warning indication for abnormal early arrival from one or more BSs, it re-determines the transmission delay based on information received from all BSs involved in transmissions for the MBS service flow.

If one or more BS's report a failure indication for late arrival, the MBS scheduler increases the transmission delay by an amount that is at least equal to the largest reported late arrival amount, and if at the same time, one or more BS's report warning indication for abnormal early arrival, their Allowed Early Arrival threshold can be increased accordingly to prevent extraneous warning indications. If none of BSs reports failure indication for late arrival and one or more BSs report warning indications for abnormal early arrival, then the transmission delay can be reduced by the amount of the smallest reported early arrival duration.

For each MBS data packet, MBS scheduler sends the transmission time along with the packet to each BS. As an example, frame number can be used as a form of transmission time.

IEEE 802.16j defines a mobile relay network which supports MBS services with synchronized transmissions for an MBS service flow, including exact synchronization required for macro-diversity, from BSs of an MBS service region. The method as described herein for synchronizing transmissions among a group of BSs and including any subtending RSs, such as within an MBS service region, can be introduced to 802.16j to provide synchronized transmission of MBS data. The following changes should be made to that standard to support this mechanism:

1. For MBS data transmission with multi-MR-BS MBS, each MAC PDU begins with a relay MAC header. FIG. 4 and FIG. 5 show formats of a relay MAC header and a MAC PDU, respectively.

2. A new MBS subheader is defined. The MBS subheader contains a Target Transmission Time field that contains a sufficient number of the least significant bits of the over-the-air sequential transmission frame number, such as the least significant 16 bits or the least significant 6 bits of the over-the-air frame number, to allow a sufficient transmission time range to be specified. The full frame number that identifies the transmission frame for the MBS data is the concatenation of the lower bits as specified by the Target Transmission Time in the MBS subheader and the upper N bits of the current transmission frames, where N is the difference between the full length of the transmission frame number and the number of least significant bits specified by the Target Transmission Time. This full frame number indicates the target transmission frame number at which the RS transmits the MBS MAC PDU to MS over the access link. The MR-BS includes one MBS subheader in the MBS MAC PDU sending to the access RS.

Example formats for this MBS subheader are shown in FIG. 7, where in FIG. 7a, the Target Transmission Time field is 16 bits long and is defined in a separate MBS subheader format, and in FIG. 7b, the Target Transmission Time field is 6 bits long and is included as part of a more general Allocation subheader. For the example of FIG. 7b, the other fields of this exemplary Allocation subheader are not pertinent to the synchronization method described herein and therefore, are not described or discussed herein.

3. The intermediate RS forwards the MBS MAC PDU to the access RS.

4. The access RS removes the relay MAC Header and subheader and transmits the access link MAC PDU to MS at the target transmission frame specified by the Target Transmission Time in the relevant subheader in the MBS MAC Header.

5. The RS sends a failure indication for late arrival in the form of an MBS NACK feedback header, an exemplary format of which is shown in FIG. 6, to MR-BS if RS fails to transmit MBS MAC PDU at the designated transmission time. RS includes arrival delay in MBS NACK feedback header. The arrival delay is the number of additional frames in advance in which RS requires to receive MBS data from MR-BS. Optionally, RS may transmit a warning indication for abnormal early arrival also in the form of an MBS NACK feedback header, an exemplary format of which is shown in FIG. 6, to MR-BS if MBS MAC PDU arrives at RS too early. The triggering of the generation of the MBS NACK feedback header as a warning indication for abnormal early arrival is based on the Allowed Early Arrival threshold as described in Clause [0034].

Relay MAC PDU is transmitted between MR-BS and RS. FIG. 4 shows that Relay MAC PDU can include relay MAC Header. FIG. 5 shows that, for MBS MAC PDU, Relay MAC Header indicates the inclusion of a separately defined MBS subheader, an example format of which is shown in FIG. 7a, by setting MBS bit to 1. Although the MBS bit is shown as the second bit of the first byte of the Relay MAC Header, this is for illustration purposes only and the MBS bit may be located in any suitable location within the Relay MAC Header.

FIG. 8 shows another example format for the Relay MAC Header when the Target Transmission Time information is included as part of a more general Allocation subheader, an example format of which is shown in FIG. 7b. For the example of Allocation subheader, inclusion of Target Transmission Time information in the MBS MAC PDU is indicated by the ASH bit set to 1.

An MBS subheader can be included for all MBS MAC PDU from MR-BS to RS and from RS to subordinate RS. For example, the MBS subheader can contain the least 16 bits of frame number of the frame for which the RS shall transmit the MBS MAC PDU to the MS. The following table illustrates an example for such a subheader.

| Syntax | Size | Notes |
|---|---|---|
| MBS subheader{ | | |
| Frame Number | 16 bits | Indicates the frame which RS shall transmit the MAC PDU to the MS |
| } | | |

The Target Transmission Time information can be included within a suitable subheader, such as the MBS subheader of FIG. 7a or the Allocation subheader of FIG. 7b, for all MBS MAC PDU from MR-BS to RS and from RS to subordinate RS.

FIG. 6 shows an example of MBS NACK Feedback header that is used both for failure indication for late arrival and warning indication for abnormal early arrival. The Feedback Type can be set to any available value, such as binary 1100 or binary 1110. An Early/Late Indication (ELI) bit indicates whether a failure indication for late arrival or a warning indication for abnormal early arrival is applicable. For example, an Early/Late Indication bit value equal to 0 can represent a failure indication for late arrival and a bit value equal to 1 can represent a warning indication for abnormal early arrival, or the converse interpretation of the Early/Late Indication bit values can be defined. The MBS NACK Feedback header can include Arrival Delta information to indicate the number of frames RS receive MBS data from MR-BS late or early with the interpretation corresponding to the respective setting of the Early/Late Indication bit. CID is set to CID of the MBS transport connection for which the RS is sending MBS failure or warning indication feedback header.

Hence, based on the above, a method can be provided to provide synchronized data transmission for an MBS service flow in wireless relay network having relay stations and base stations. In this method, a centralized MBS scheduler entity is provided to determine the transmission time of each MBS data packet for all BSs; each BS is operated to send the Target Transmission Time along with the MBS data packet to all RSs attached to it that carries data packets for the MBS service flow; an RS is operated to transmit MBS data packet to MS at the Target Transmission Time; and an RS is operated to send a failure indication for late arrival, such as in the form of an MBS NACK Feedback header with the Early/Late Indication bit set accordingly, to BS if the RS is not able to transmit the MBS data packet due to late arrival. Optionally, the RS is operated to send warning indication for abnormal early arrival, such as in the form of an MBS NACK Feedback header with the Early/Late Indication bit set accordingly, to BS if RS detects abnormal early arrival of MBS data packets. In this method, BS is operated to adjust the applicable access relay path delay for synchronized data transmission based on MBS NACK Feedback headers received as failure indications for late arrival or in the absence of failure indications, as warning indications for abnormal early arrival according to method described in Clause [0035] and sends the adjusted access relay path delay to centralized MBS scheduler. The centralized MBS scheduler is further operated to determine the transmission time for each MBS data packet based on BS reporting.

In implementation of the above method, one or more of the following features may be included.

1. As an option, the BS is operated to report its cumulative path delay based on RS capability parameters at system initialization.

2. The BS is operated to send transmission time in the form of Target Transmission Time for each MBS data packet to the access RS. The target transmission time can be sent as in-band signaling which is included in the subheader of each MBS data packet.

3. The failure indication for late arrival, such as in the form of an MBS NACK Feedback header, can be generated and include the duration of late arrival of MBS packet when late arrival of MBS packet at RS is detected.

4. The warning indication for abnormal early arrival, such as in the form of an MBS NACK Feedback header, can be generated and include the duration of early arrival of MBS packet when abnormally early arrival of MBS packet at RS is detected.

5. The MBS NACK Feedback header can include an indication whether duration for early arrival or late arrival is included.

6. When detecting early arrival of MBS data packet at a RS, a threshold can be used to determine if a warning indication for abnormal early arrival, such as in the form of an MBS NACK Feedback header, should be sent to BS.

7. The method can use an algorithm to allow the BS to use the failure indications for late arrival or warning indications for abnormal early arrival, such as in the form of MBS NACK Feedback headers, and duration information contained therein to recalculate the longest cumulative path delay to the access RSs within the span of control of the BS, and possibly to adjust the thresholds triggering abnormal early arrival detection in one or more of these RSs.

Also based on the above, another method can be provided for synchronized data transmission for a MBS service in wireless network having base stations. In this method, a centralized MBS scheduler entity is operated to determine the transmission time of each MBS data packet for all BSs, BS is operated to transmit MBS data packet to MS at Target Transmission Time, the BS is operated to send a failure indication for late arrival or warning indication for abnormal early arrival to the centralized MBS scheduler if the BS is not able to transmit the MBS data packet due to late arrival or if BS detects abnormal early arrival of MBS data packets, respectively, and the centralized MBS scheduler is operated to determine the transmission time for each MBS data packet based on received failure and warning indications, such as according to the method described in Clause [0042].

This method can be implemented to include one or more of the following features. 1. The BS is operated to report its delay information at system initialization. 2. The failure indication for late arrival can be generated and include the duration of late arrival of MBS packet when late arrival of MBS packet at BS is detected. 3. The warning indication for abnormal early arrival can be generated and include the duration of early arrival of MBS packets when abnormal early arrival at BS is detected. 4. The failure or warning indication can include an indication whether duration for early arrival or late arrival is included. 5. When detecting early arrival of MBS data packet at a BS, a threshold can be used to determine if warning indication for abnormal early detection should be sent to the centralized MBS scheduler entity. 6. an algorithm can be provided to allow the MBS scheduler to use the failure indications for late arrival or the warning indications for abnormal early arrival and duration information contained therein to adjust the transmission time of future MBS data to one or more BSs within the MBS scheduler's span of control, and possibly to adjust the thresholds for abnormal early arrival detection in one or more of these BSs.

While this specification contains many specifics, these should not be construed as limitations on the scope of an invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination.

Only a few implementations are disclosed. However, it is understood that variations and enhancements may be made.

What is claimed:

1. A wireless communication relay network, comprising:
    a plurality of base stations forming a radio network;
    a plurality of relay stations in communication with the base stations, each relay station being slaved to a base station to extend radio coverage of the base station;
    a Multicast Broadcast Services (MBS) scheduler to determine a target transmission time for transmitting a MBS data packet for one or more base stations;
    a mechanism to operate a base station to send the target transmission time along with the MBS data packet to one or more relay stations that carry the MBS service; and
    a mechanism to operate, a respective relay station in a relay path of the MBS data packet, to receive the MBS data packet from the base station, to transmit the MBS data packet to a subscriber or mobile station in the network at the target transmission time, and to send a failure indication to a base station when the relay station is not able to transmit the MBS data packet due to a late arrival and to send a warning indication for abnormal early arrival of the MBS data packet.

2. The network as in claim 1, comprising:
    a mechanism to operate a base station to adjust an applicable access relay path delay for synchronized data transmission based on a received failure indication for late arrival or a warning indication for abnormal early arrival of the MBS data packet and send the adjusted access path delay to the MBS scheduler; and
    a mechanism to operate the MBS scheduler to determine a new transmission time for the MBS data packet based on information from a base station.

3. The network as in claim 2, comprising:
    a mechanism to include information on a target transmission time in a subheader within a Relay Medium Access Control (MAC) Header in a message sent from the MBS scheduler to the base station.

4. The network as in claim 1, comprising:
    a mechanism to include information on a target transmission time in a subheader within a Relay Medium Access Control (MAC) Header of relay MAC protocol data units (PDUs) that are sent from a respective base station directly to a relay station or indirectly to a relay station through at least one other intermediate relay station between the base station and the relay station.

5. The network as in claim 1, comprising:
    a mechanism to trigger a base station to send a failure indication to the MBS scheduler regarding the failure of the relay station to transmit the MBS data packet due to the late arrival or the warning indication for abnormal early arrival of the MBS data packet.

6. The network as in claim 5, comprising:
    a mechanism to operate a base station to report the MBS scheduler, in response to the failure indication, a currently applicable access path delay.

7. The network as in claim 1, wherein the failure indication sent by a relay station to a base station is included in a feedback signal.

8. The network as in claim 7, wherein the feedback signal is a negative acknowledgement (NACK) message.

9. A wireless communication relay network, comprising:
    a plurality of base stations forming a radio network;
    a plurality of relay stations in communication with the base stations, each relay station being slaved to a base station to extend radio coverage of the base station;
    a Multicast Broadcast Services (MBS) scheduler to determine a target transmission time or a target transmission time window for transmitting a MBS data packet for one or more base stations;
    means for operating a base station to send the target transmission time or target transmission time window along with the MBS data packet to one or more relay stations that carry the MBS service; and
    means for operating a respective relay station in a relay path of the MBS data packet to receive the MBS data packet from the base station, to transmit the MBS data packet to a subscriber or mobile station in the network at the target transmission time or within the target transmission time window, and to send a failure indication to a base station when the relay station is not able to transmit the MBS data packet due to a late arrival and to send a warning indication for abnormal early arrival of the MBS data packet.

10. The network as in claim 9, comprising:
    means for operating a base station to adjust an applicable access relay path delay for synchronized data transmission based on a received failure indication for late arrival or warning indication for abnormal early arrival of the MBS data packet and send the adjusted access path delay to the MBS scheduler; and
    means for operating the MBS scheduler to determine a new transmission time or transmission time window for the MBS data packet based on information from a base station.

11. The network as in claim 10, comprising:
    means for providing information on a target transmission time or target transmission time window in a subheader within a Relay Medium Access Control (MAC) Header in a message sent from the MBS scheduler to the base station.

12. The network as in claim 9, comprising:
    means for providing information on a target transmission time or target transmission time window in a subheader within a Relay Medium Access Control (MAC) Header of relay MAC protocol data units (PDUs) that are sent from a respective base station directly to a relay station or indirectly to a relay station through at least one other intermediate relay station between the base station and the relay station.

13. The network as in claim 9, comprising:
    means for triggering a base station to send a failure indication to the MBS scheduler regarding the failure of the relay station to transmit the MBS data packet due to the late arrival or abnormal early arrival of the MBS data packet.

14. The network as in claim 13, comprising:
means for operating a base station to report the MBS schedule, in response to the failure indication, a currently applicable access path delay.

15. The network as in claim 9, wherein the failure indication sent by a relay station to a base station is included in a feedback signal.

16. A method for providing Multicast Broadcast Services (MBS) in a wireless communication relay network which includes a plurality of base stations forming a radio network and a plurality of relay stations in communication with the base stations with each relay station being slaved to a base station to extend radio coverage of the base station, the method comprising:
providing a MBS scheduler to determine a target transmission time or a target transmission time window for transmitting a MBS data packet for one or more base stations;
operating a base station to send the target transmission time or target transmission time window along with the MBS data packet to one or more relay stations that carry the MBS service;
operating a respective relay station in a relay path of the MBS data packet to receive the MBS data packet from the base station, to transmit the MBS data packet to a subscriber or mobile station in the network at the target transmission time or within the target transmission time window; and
operating the respective relay station to send a failure indication to a base station when the relay station is not able to transmit the MBS data packet due to a late arrival of the MBS data packet and a warning indication for abnormal early arrival of the MBS data packet.

17. The method as in claim 16, comprising:
operating a base station to adjust an applicable access relay path delay for synchronized data transmission based on a received failure indication for late arrival or a warning indication for an abnormal early arrival of the MBS data packet and send the adjusted access path delay to the MBS scheduler; and
operating the MBS scheduler to determine a new transmission time or transmission time window for the MBS data packet based on information from a base station.

18. The method as in claim 17, comprising:
providing information on a target transmission time or target transmission time window in a subheader within a Relay Medium Access Control (MAC) Header in a message sent from the MBS scheduler to the base station.

19. The method as in claim 16, comprising:
providing information on a target transmission time or target transmission time window in a subheader within a Relay Medium Access Control (MAC) Header of relay MAC protocol data units (PDUs) that are sent from a respective base station directly to a relay station or indirectly to a relay station through at least one other intermediate relay station between the base station and the relay station.

20. The method as in claim 16, comprising:
triggering a base station to send a failure indication to the MBS scheduler regarding the failure of the relay station to transmit the MBS data packet due to the late arrival or warning indication for abnormal early arrival of the MBS data packet.

21. The method as in claim 20, comprising:
operating a base station to report the MBS schedule, in response to the failure indication, a currently applicable access path delay.

22. A method of providing a multicast broadcast service (MBS) in a wireless communication relay system which includes a plurality of base stations forming a radio network and a plurality of relay stations in communication with the base stations with each relay station being slaved to a base station to extend radio coverage of the base station, the method comprising:
causing a base station to transmit MBS data and a target transmission time window for transmitting the MBS data to a relay station;
causing the relay station to transmit the MBS data to a subscriber or mobile station within the target transmission time window; and
causing the relay station to send a failure indication signaling to a base station to report a late arrival of MBS data when the relay station receives the MBS data at a time after the target transmission time window, or to report an abnormal early arrival of the MBS data.

23. The method as in claim 22, comprising:
causing a relay station to send an indication signaling to a base station to report a late arrival of MBS data when the relay station receives the MBS data at a time after the target transmission time window, or when the relay station reports an abnormal early arrival of MBS data.

24. The method as claim 22, comprising:
causing a relay station to report a delay of the MBS data to a respective base station during a process for capability negotiation; and
causing the base station to determine a cumulative path delay of the base station associated with a largest path delay of a relay path.

25. The method as claim 24, comprising:
causing the base station to report the cumulative path delay to the MBS scheduler; and
causing the MBS scheduler to determine the target transmission time window based on information received from the base station and other base stations involved in the MBS connection.

26. The method as in claim 25, comprising:
causing MBS scheduler to send the determined target transmission time window along with the MBS data to each base station.

27. The method as in claim 22, comprising:
causing the base station to insert a subheader in the MBS Relay Medium Access Control (MAC) Protocol Data Unit (PDU) that is sent to a relay station, wherein the subheader includes the information of the target transmission window time; and
causing the relay station to remove the received relay MAC header and subheader and transmit the MBS data to a subscriber or mobile station over an access link at the target transmission time or within the target transmission time window.

28. The method as in claim 27, comprising:
operating the base station to include a frame number in a subheader to identify the target transmission time window.

29. The method as in claim 28, comprising:
using 16 bits or 6 least significant bits of the frame number to identify the target transmission time window.

30. The method as in claim 22, comprising:
causing the base station to determine a cumulative path delay of the base station associated with a largest path delay of a relay path;

causing the base station to determine a new cumulative path delay after receiving indication signaling from one or more relay stations about delay in transmission of MBS data;

causing the base station to report the newly determined cumulative path delay to the MBS scheduler; and causing the MBS scheduler to determine a new target transmission time window in response to the report from the base station.

31. The method as in claim 30, comprising:

causing the base station to increase the cumulative path delay, which is equal to or greater than the largest reported late arrival amount when the base station receives only indication signaling for late arrival of MBS data from one or more relay stations.

32. The method as in claim 30, comprising:

causing BS to reduce the cumulative path delay to the smallest reported early arrival amount when BS receives only indication signaling for early arrival of MBS data from one or more relay stations.

33. The method as in claim 22, comprising:

using a threshold as a trigger for an early arrival of MBS data.

34. The method as in claim 22, comprising:

causing a relay station to transmit an early arrival indication signal when the relay station receives a MBS Medium Access Control (MAC) Protocol Data Unit (PDU) prior to the target transmission time window.

35. The method as in claim 22, comprising:

using a MBS feedback header to carry the indication signaling indicates the early arrival or late arrival of the MBS data.

36. The method as in claim 35, comprising:

providing a MBS feedback header to include a bit to indicate an early or late arrival of the MBS data.

37. The method as in claim 35, comprising:

providing a MBS feedback header to include a connection identifier (CID) to identify an MBS transport connection to which the relay station is sending the MBS feedback header.

38. The method as in claim 35, comprising:

providing a MBS feedback header to include information on an amount of delay or advancement in receiving MBS data by a relay station with respect to the target transmission time window.

39. A wireless communication relay network, comprising:

a plurality of base stations forming a radio network;

a plurality of relay stations in communication with the base stations, each relay station being slaved to a base station to extend radio coverage of the base station;

a Multicast Broadcast Services (MBS) scheduler to determine a target transmission time window for transmitting MBS data by each of the base stations involved in a MBS connection;

means for operating a respective base station to transmit MBS data to a subscriber or mobile station within the target transmission time window; and means for causing the base station to send to the MBS scheduler (1) an indication signaling for late arrival of MBS data when BS fails to transmit MBS data to a subscriber or mobile station within the target transmission window, or (2) an indication signaling for early arrival of MBS data when BS detects abnormal early arrival of MBS data.

40. The network as in claim 39, comprising:

means for operating a base station to report MBS delay information to the MBS scheduler during system initialization.

41. The network as in claim 39, comprising:

means for causing the base station to send to the MBS scheduler (1) an indication signaling for late arrival of MBS data when BS fails to transmit MBS data to a subscriber or mobile station within the target transmission window, or (2) an indication signaling for early arrival of MBS data when BS detects abnormal early arrival of MBS data.

42. The network as in claim 39, comprising:

means for configuring an indication signaling to include an indication whether the duration of early arrival or late arrival is included.

43. The network as in claim 39, comprising:

means for configuring an indication signaling to include a connection identifier (CID) to identify an MBS transport connection to which the base station is sending the indication signaling.

44. The network as in claim 39, comprising:

means for providing a threshold to determine whether a base station sends an indication signaling for early arrival of MBS data, when BS detects early arrival of MBS data.

45. The network as in claim 39, comprising:

means for operating the MBS scheduler to adjust the target transmission time window for transmitting MBS data to one or more base stations within a control range of the MBS scheduler based on the indication signaling and information contained therein.

* * * * *